United States Patent
Richenderfer et al.

(12) 
(10) Patent No.: US 6,469,806 B1
(45) Date of Patent: Oct. 22, 2002

(54) METHOD AND APPARATUS FOR REDUCING EXCESS DEVELOPER MATERIAL AT THE EDGES OF PRINT SHEETS OF FULL BLEED IMAGES VIA DIGITAL IMAGE PROCESSING

(75) Inventors: Elizabeth A. Richenderfer, Fairport, NY (US); Stuart A. Schweid, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/216,528

(22) Filed: Dec. 18, 1998

(51) Int. Cl.$^7$ ................................................ G06F 19/00
(52) U.S. Cl. ..................................... 358/3.21; 358/3.02
(58) Field of Search ................................ 358/1.9, 3.02, 358/3.1–3.12, 3.21–3.22; 382/266–269, 257–259, 260–265

(56) References Cited

U.S. PATENT DOCUMENTS 4,169,275 A * 9/1979 Gunning ..................... 358/300
5,528,387 A * 6/1996 Kelly et al. ................. 358/488
5,689,425 A * 11/1997 Sainio et al. ........... 364/469.03
5,748,326 A * 5/1998 Thompson-Bell et al. .. 358/296
5,999,203 A * 12/1999 Cane et al. ................. 347/171

* cited by examiner

Primary Examiner—Thomas D. Lee
Assistant Examiner—Stephen Brinich
(74) Attorney, Agent, or Firm—Fay, Sharpe, Fagan, Minnich & McKee, LLP

(57) ABSTRACT

A digital image processing apparatus is disclosed. The apparatus increases input pixel intensity values in an edge region of input image data to form output pixel intensity values. The input pixel intensity values are varyingly increased depending on a location of the input pixel values within the edge region. The output values are printed on an edge region of a print sheet. A printer prints the output intensity pixel values on a print sheet. The invention allows printing of digital images to the edge of a print sheet without accumulating a great deal of toner at the edge of the sheet or overburdening a toner cleaning device.

16 Claims, 5 Drawing Sheets

METHOD AND APPARATUS FOR REDUCING EXCESS DEVELOPER MATERIAL AT THE EDGES OF PRINT SHEETS OF FULL BLEED IMAGES VIA DIGITAL IMAGE PROCESSING

FIELD OF THE PRESENT INVENTION

The present invention is directed to the digital color imaging arts. It finds particular application to a system and method of printing a digital color image and will be described with particular reference thereto. Of course, it is to be appreciated that the invention is also applicable to printing monochrome images and to other environments and applications, such as other digital rendering systems, e.g., direct-to-plate systems, and video displays.

BACKGROUND OF THE PRESENT INVENTION

In commercial electronic printing, a printer, such as a graphics artist or document layout specialist, prepares a digital document or source file containing text, graphics, and images. The digital document is prepared in a PDL (page description language) or any other image data format on a host computer or any of various DTP (desk-top publishing) computers. Representative PDLs include PostScript (registered trademark of Adobe) and Interpress (registered trademark of Xerox).

The source file is transferred to an image processing device which interprets and processes the file for image formation. That is, the image processing device processes or decomposes the PDL file into a contone image of 8 bits per pixel or a byte map. The contone (continuous tone) image is an array of pixel information in a particular color space. One such color space is RGB which stands for the colors red, green and blue (RGB). Another color space is CMYK which stands for cyan (C), magenta (M), yellow (Y) and black (K), which are often the colors used in printing. In these examples, each pixel is represented as a combination of intensity values or grey scale pixel values, typically from 0 to 255, of each of the colors. The 0 value represents the maximum intensity of color and the 255 value represents the minimum intensity of color, i.e., white.

Still another color space used in digital image processing is luminance-chrominance space termed CIE 1976 L*a*b* (CIELAB). In L*a*b* space, L* is a lightness or luminance value, a* is a redness-greenness value, and b* is a yellowness-blueness value.

To print the image, the image processing device or a print engine includes a half-toner or screen generator which converts the contone image data in the particular color space into a raster image. Typically, the half toner renders a raster image for each of the print colors cyan, magenta, yellow and black (CMYK). Each raster image is composed of pixel data of 1 bit/pixel. Thus, each bit is simply an instruction whether or not to place a dot of color at a particular point on an output page.

The raster image data is then used to illuminate a photoreceptor for transferring the image onto a print sheet. In one example, a raster output scanner (ROS) exposes an electrophotographic surface such as a photoconductive belt or drum to record four latent images which correspond to the four raster images. One latent image is developed with cyan developer material. Another latent image is developed with magenta developer material, a third latent image is developed with yellow developer material, and a fourth latent image is developed a black developer material. These developed images are transferred to a print sheet in superimposed registration with one another to form a multicolored image on the print sheet. This multicolored image is then fused to the print sheet forming to form a color print of the document.

To image to the very edges of the print sheet, an oversized photoreceptor or photoconductive surface is used, i.e., a photoconductive surface is selected which is larger than the print sheet surface. This prevents unmarked areas at the edges of the print sheet if the sheet is misregistered relative to the photoconductive surface. Such an error is extremely noticeable for instance when an image containing a dark background is placed onto a white print sheet. This error shows up as a white rim on one or two edges of the print sheet.

The problem with an oversize photoconductive surface is that developer material is applied to regions of the photoconductive surface that will not contact the print sheet. This excess developer material must be cleaned off. Such a process overloads the cleaning system subjecting it to failure and/or additional cost and wastes developer material.

An alternative is to use an oversize photoconductive surface and an oversize print sheet. After the image is transferred to the print sheet, the edge of the print sheet is trimmed to the desired size. This technique also wastes developer material and adds the extra step of trimming to the printing process.

In the case of a digital reproduction machine or photocopier, a similar problem arises when a user reproduces a document that is undersized or incorrectly places a document onto the imaging platen off-center or at an off-angle. In such a case, the underside of the cover of the photocopier, which is often dirty, is imaged along with the document. This causes dirt, smudges, and the like to appear at in the edge regions of the reproduced document. Further, it causes an edge or edges of the original document to appear on the reproduced document.

To minimize the effect of this error, a digital image processing device in the photocopier blanks around the image. The conventional way of blanking around the image is by replacing margin pixels with a predetermined pixel value using a set size of the margin. Unfortunately, this usually results in digitally blanking out parts of the original document which might contain important data.

It would therefore be desirable to provide a printing system which images to the edge of a print sheet without excessive waste of developer material or overloading developer cleaning devices.

SUMMARY OF THE PRESENT INVENTION

In accordance with one aspect of the present invention, a digital image printing apparatus is disclosed. The apparatus increases input pixel intensity values in an edge region of input image data to form output pixel intensity values. The output values are printed on an edge region of a print sheet. An edge processor reduces the input pixel intensity values to form output intensity pixel values. A printer prints the output intensity pixel values on a print sheet.

In a more limited aspect of the present invention, the edge processor accesses a look-up table memory which includes look-up tables for mapping the input intensity pixel values at an edge region of the input image to the output intensity pixel values.

In another aspect of the present invention, a method of digital image processing is disclosed. The method increases input pixel intensity values in an edge region of input image data to form output pixel intensity values that are printed on an edge region of a print sheet. The input pixel intensity values for the edge region of the input image are reduced to form output intensity pixel values. The output intensity pixel values are printed.

One advantage of the present invention is that it conserves developer applied to the edges of print sheets of full bleed images which saves printing costs.

Another advantage of the present invention is that reduces the burden on cleaning devices which remove excess developer material from photoconductive surfaces.

Yet another advantage is that it maintains the visibility of information at the edges of documents rather than blanking it out altogether.

Still yet another advantage is that it allows information, such as writing, at the edge of a page to be discerned.

Yet another advantage is that the width of the affected edge region of the page and the amount of image suppression in the edge region may be easily adjusted or programmed.

Still further advantages of the present invention will become apparent to those of ordinary skill in the art upon reading and understanding the following detailed description of the preferred embodiments.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

Figure 1:
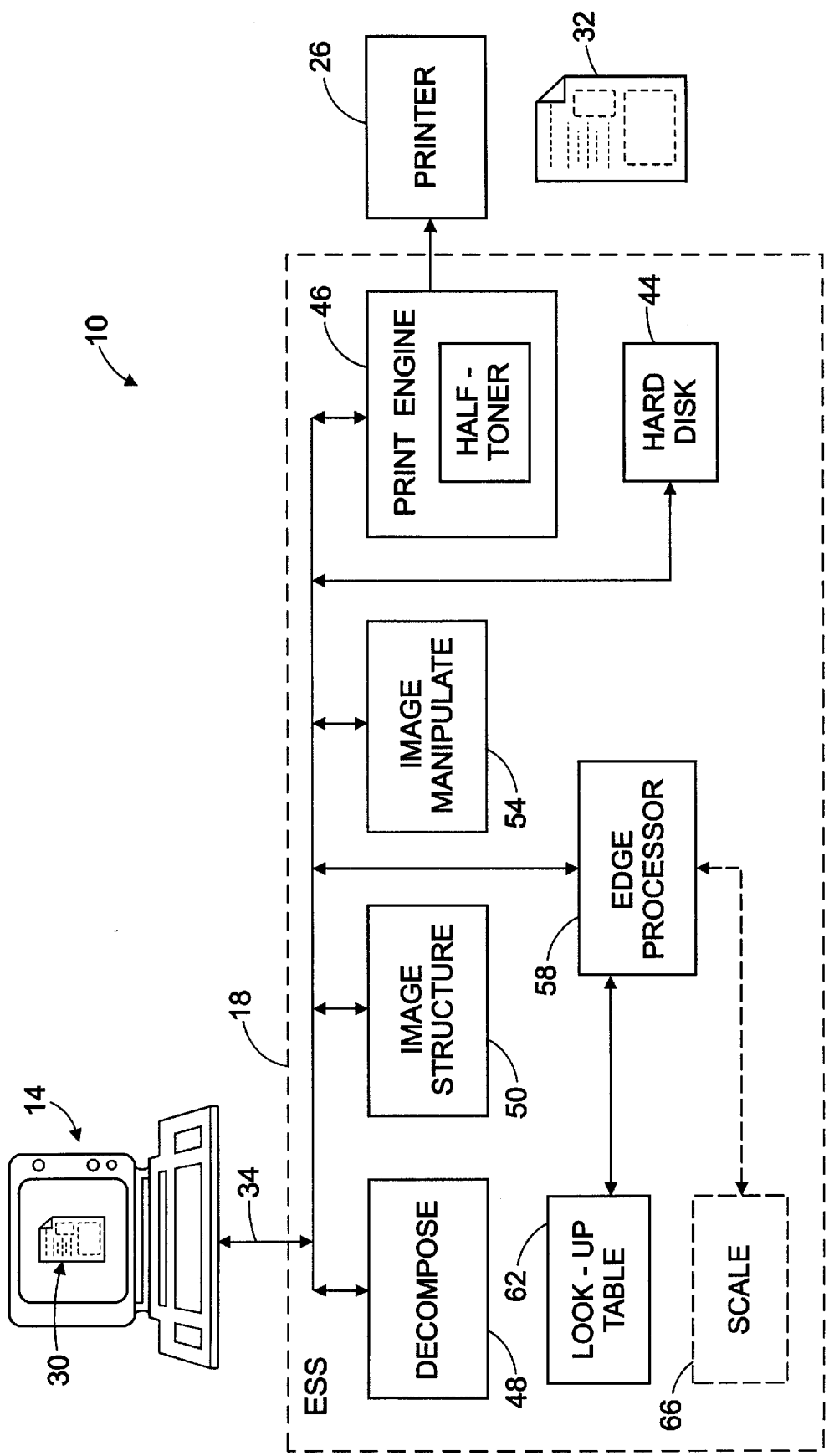
FIG. 1 is a block diagram of a digital color image printing system which reduces the grey scale pixel values in the edge regions of printed documents in accordance with the present invention.

With reference to FIG. 1, an exemplary system for carrying out the present invention is a digital color image printing system 10. The printing system includes a remote computer 14, a control system, which is known as an electronic subsystem (ESS) 18, and a printer 26. The ESS is a programmable microprocessor system, as exemplified by U.S. Pat. No. 4,485,156 and its references which are hereby incorporated by reference. An operator creates a digital document 30 on the computer. The ESS processes and adjusts the image characteristics of the document, and the printer prints out a representation of the adjusted document 32.

More particularly, an operator, such as a graphics artist, runs a composition program on the computer to create the digital document which contains objects such as color images, graphics and/or text. The operator may use scanned images, computer programs, or other generation means to create the digital document. Typically, such generation means generates three-dimensional color signals, i.e., red, green, blue (RGB) to represent the objects; however, the generation means may also generate other combinations of colors such as cyan, magenta, yellow and black (CMYK). It is of course to be appreciated by those skilled in the art that other color separations beyond RGB and CMYK are contemplated, which use other colors and more color separations. The digital document is displayed on the monitor of the computer as an array of grey scale pixel values (ranging from 0 to 255) representing the intensity of each of the plurality of RGB colors at each pixel location. In the preferred embodiment, 0 represents full color intensity and 255 represents no color intensity. The composition program describes the displayed image in a page description language (PDL), e.g. Postscript.

The PDL file is transferred to the ESS via a network 34. Of course, the PDL file may be transferred to the ESS in other ways such as being physically transferred on a floppy disk or other storage media.

The ESS controls all image processing, machine steps and functions described herein, and others, including the operation of the printer. To do this, the ESS includes an image processing station (IPS) 38, a hard disk 44, and a print engine 46. In the preferred embodiment, the ESS is an 8-bit system. However, in alternative embodiments, the system can be a 10-, 12- or other numbered bit system.

The IPS includes a decomposition processor 48 which decomposes the PDL file into a contone image, i.e., a byte map. Further, the IPS includes an image structure analysis processor 50 which selectively performs color-space conversion, black page detection, background detection, edge detection, segmentation, auto-windowing, auto-image enhancement and the like. Still further, the IPS includes an image manipulation processor 54 which selectively performs window tagging, rotation, filtering, scaling, background suppression, tone reproduction adjustment, fuzzy rendering, cropping and masking, annotation, and the like. The processing and control functions of the ESS are performed by a combination of software, which is resident on the hard disk 44, and applied specific integrated chips (ASICs).

The image processing station also includes an edge processor 58. The edge processor essentially identifies an edge region of the digital document which corresponds to a margin or edge region around the print sheet and performs an adjustment of the input grey scale pixel values within that region. The edge processor performs this function on a scanline basis. In a preferred embodiment for use with 8½×11 inch or A4 paper, the size of the margin is 6 mm. Of course, the size of the margin is adjustable depending on the size of the print sheet, type of print job, paper handling device, magnitude of possible misregistration, and other factors. In other preferred embodiments the edge region is approximately equal to or less than 15 mm, 10 mm, 8 mm, 5 mm, and 3 mm.

The edge processor accesses a look-up table in a look-up table memory 62. The look-up table maps an input grey scale value, typically from 0 to 255, with an output grey scale value based on the distance of the pixel from the outer edge of the print sheet. The look up table is selected to increase the grey scale value of pixels that are in the edge region. Further, the look up table is selected to increasingly increase or ramp up a given grey scale value of a pixel the closer the pixel is to the outer edge of the print sheet. In other words, the pixel values are ramped up as one moves towards the outer edge of the print sheet. For example, an input grey scale pixel value of 5, which is very dark, at the inner edge of the 6 mm margin might be outputted as 5, while the same input value would be outputted as a value of 150, which is much lighter, 3 mm from the outer edge of the print sheet. This minimizes the application of toner on the photoconductive belt in regions that are to be applied to the outer 6 mm margin of the print sheet.

It is to be appreciated by those skilled in the art that the edge look-up table is akin to the look-up tables that represent tone-reproduction curves (TRCs) that are conventionally used in digital printing devices. One difference between these look up tables is that edge look up table varies the difference between the input and output grey scale pixel values based on location while conventional TRC look-up tables do not.

Optionally, the edge processor accesses a scaling processor 66 which substitutes for the edge look-up table. The scaling processor performs the same function as the look-up table, i.e., increasing the grey scale pixel values as one moves out towards the edge of the document according to any equation or algorithm therefor.

The edge processor increases the input grey scale pixel values as a weighted combination of the input grey scale pixel value and the pixel value of white, i.e., 255 in the preferred embodiment. More particularly, in the edge region of the output image, each output pixel is considered to be a weighted combination of the input pixel value and the pixel value 255. The weighting is done in a way that results in the imaging of the input grey scale pixel values at the beginning of the edge region of the document, white at the very edge of the document, and a transition region between the two.

As an example, assume that the image is defined in RGB space. Each pixel value in the image can be represented as:

$$R_p = R_w*k + R_i(1-k)$$
$$G_p = G_w*k + G_i(1-k)$$
$$B_p = R_w*k + B_i(1-k) \quad (1)$$

where $(R_p, G_p, B_p)$ is the value of the output pixel after application of the full bleed correction, $(R_i, G_i, B_i)$ is the value of an input pixel in the image before full bleed correction, $(R_w, G_w, B_w)$ is the numerical value of a white pixel, and k is a multiplier between 0 and 1.

Figure 2A:
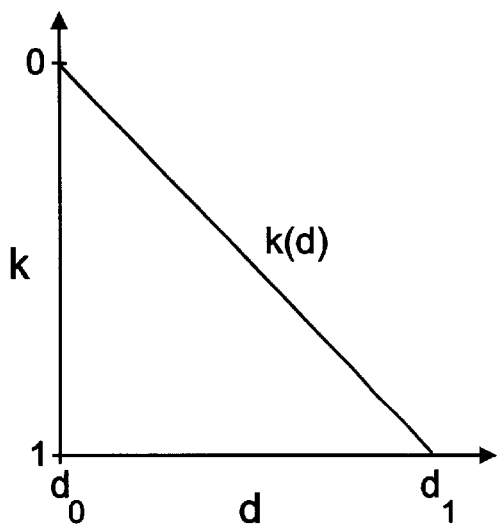
FIG. 2A is a graph of a relationship between an adjustment factor k and the location d within an edge region of the print sheet; the factor k is used to linearly increase the input grey scale pixel value to produce an output grey scale pixel value as one moves from an inner edge to an outer edge of the edge region of a print sheet; k is shown in reverse fashion, i.e., going from 1 at the bottom of the k-axis to 0 or at the top of the k-axis, to better allow the visualization of reducing color intensity

With reference to FIG. 2A, the multiplier k depends linearly on the location between the beginning edge of the edge region of the document and the outer edge of the document. At the beginning of the edge region, the value of the weighting, k, is set at 0, which is shown at the top of the k axis to allow better visualization of the reduction in color intensity. This allows the input pixel value to equal the output pixel value. At the outermost edge of the document, k is set to 1.0, which is shown at the bottom of the k axis. This sets the output value of the pixel to white. Thus, as one moves from the beginning edge of the edge region of the document to the outer edge of the document, the value of k goes linearly from 0 to 1 such that the input pixel values are linearly increased towards white. FIG. 2A is a graph of the relationship between the value of k, shown on the y-axis, and the distance from the beginning edge of the edge region of the document. The graph permits the reader to visualize the relative reduction in the darkness of the output image as one moves from the beginning or inner edge of the edge region of the document towards the outer edge of the document.

With continuing reference to FIGS. 2A–2D, the value of k can be programmed to be any monotonically decreasing function of the distance from the inner edge of the edge region or margin of the print sheet. As an example, a linear function of k could be:

$$k(d)=0 \text{ for } d<d_0$$
$$k(d)=(d-d_0)/(d_1-d_0) \text{ for } d_0<=d<d_1$$
$$k(d)=1 \text{ for } d>=d_1 \quad (2)$$

where d is the distance from a reference point inside the document to an outer edge of the document and $d_0$ and $d_1$ are are a set of distances from the reference point. Further, the range between $d_0$ and $d_1$ is the transition region. In the preferred embodiment $d_0$ is at the beginning of the edge of the edge region of the document and $d_1$ is at the outer edge of the document.

The above full bleed implementation via mixing is not limited to RGB space. Equation (1) can be done in any space; all that is needed is to determine the value of a white pixel in that space for each image plane. All of the instances of (R, G, B) in equations (1) could be analogized to CMY(K) space, Lab space, etc. For example, in Lab space the equations of (1) would be rewritten as:

$$L_p = L_w*k + L_i(1-k)$$
$$a_p = a_w*k + a_i(1-k)$$
$$b_p = b_w*k + b_i(1-k) \quad (3)$$

Figure 2B:
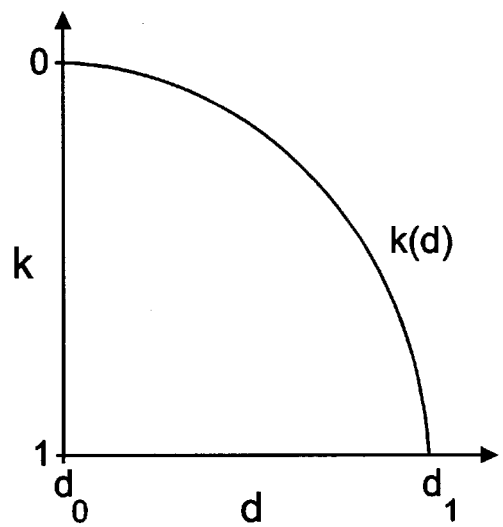
FIGS. 2B–2D are graphs of other relationships between the adjustment factor k and the location d within an edge region of the print sheet.
Figure 2C:
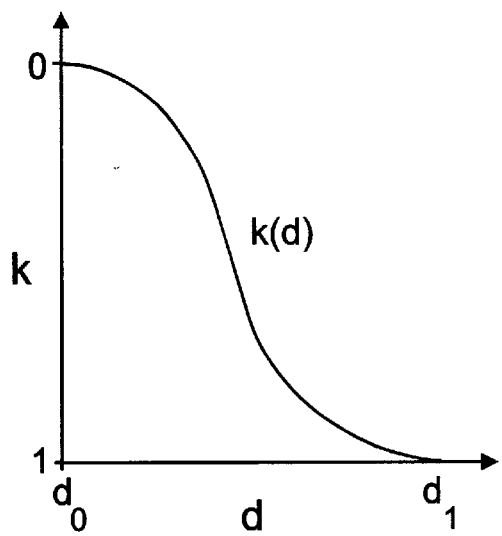
Figure 2D:
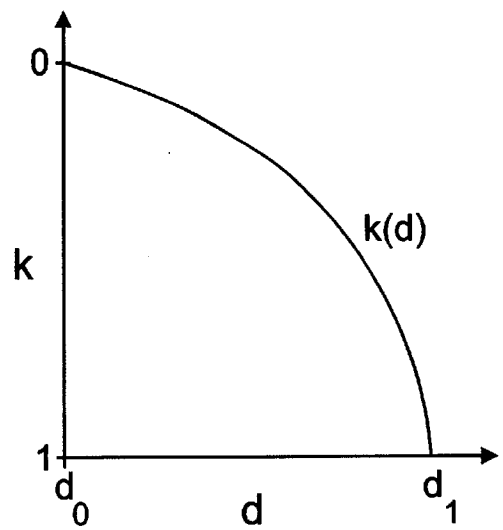

With reference to FIGS. 2B–2D, in alternative embodiments, k(d) is not linear but is represented by a cosine curve as shown in FIG. 2B, a bell curve as shown in FIG. 2C, and another curve which slopes downward and then drops off sharply towards the outermost edge of the print sheet as shown in FIG. 2D. Of course, other curves or relationships are contemplated.

Figure 3:
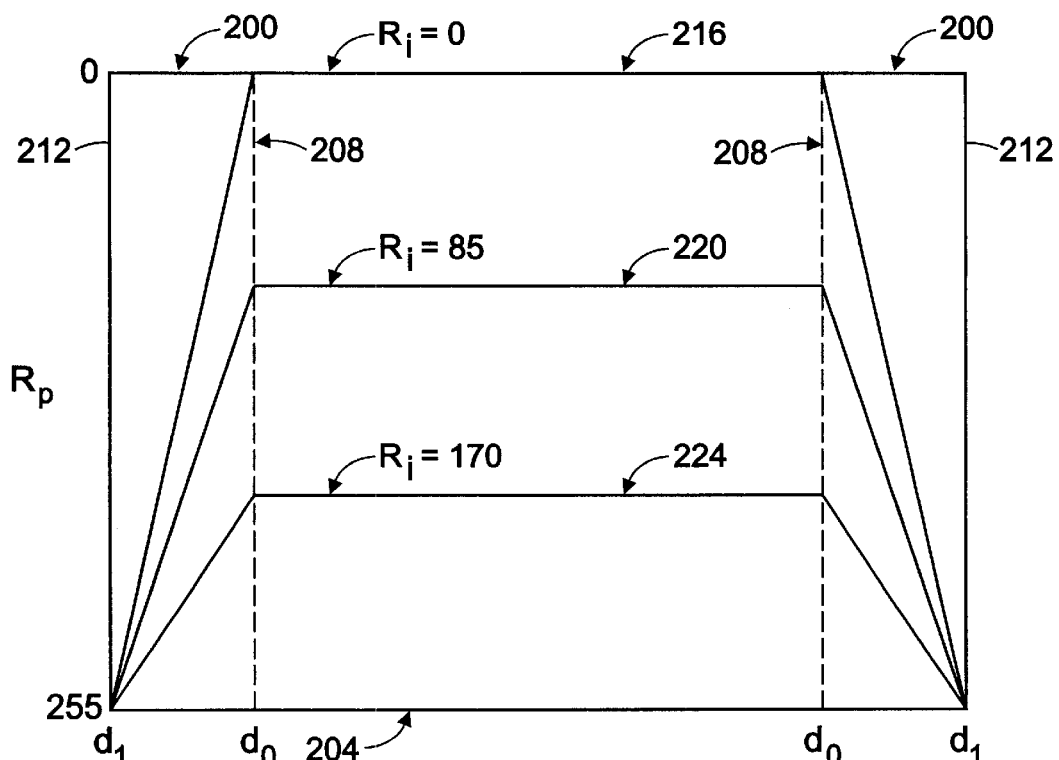
FIG. 3 is a diagram showing the reduction in three different red color intensities according to a preferred reduction scheme as one moves from a beginning to an outer edge of a side edge region of a print sheet; the left axis of the diagram shows the red output grey scale pixel value $R_p$ in reverse fashion, i.e., going from 255 or white at the bottom to 0 or full color at the top, to better allow the visualization of reducing color intensity.

With reference to FIG. 3, using the implementation represented by equations (1) and (2), the decrease in the printed red intensity in the side edge regions 200 of a print sheet 204 is shown for three different input pixel values. The side edge regions have a beginning edge region $d_0$, designated by the reference number 208, and an outer edge of the edge region $d_1$, designated by the reference number 212. The input pixel values are:

$R_i$=0, or full red, designated as 216;

$R_i$=85, or dark red, designated as 220; and $R_i$=170, designated as 224.

The reduction in the corresponding output pixel values $R_p$ are shown in the edge regions. The left axis of the diagram shows $R_p$ in reverse fashion, i.e., going from 255 or white at the bottom to 0 or full color at the top, to better allow the visualization of reducing color intensity. It is important to note that the correction or intensity reduction is a function of the input grey scale pixel value $R_i$. This has the advantage of compressing the relative relationships of: $R_i$=0, 216; $R_i$=85, 220; and $R_i$=170, 224 such that the contrast of the image in the edge regions is decreased. However, the implementation has the advantage of retaining information in the edge region of the document to the outer edge of the document.

In an alternative embodiment, the grey scale pixel value for each of the colors is increased by a constant value. Using the above described annotations, the representative equations for this alternative embodiment are:

$$R_p(d)=R_i+(c*k)$$

$$G_p(d)=G_i+(c*k)$$

$$B_p(d)=R_i+(c*k) \quad (4)$$

where c is a constant, and k(d) is defined according to the equations (2). In the present embodiment, the maximum value of $R_p$ is 255, which represents the application of no toner or the color white. By way of example, we define c=255. An input grey scale pixel value $R_i$ is not adjusted at the beginning of the margin $d_0$ because the value k is 0. However, at the outer edge of the document, the value $R_i$ is increased such that $R_p$ is set to the maximum of 255. This is because k=1 at $d_1$ and, thus, (c*k)=255.

Figure 4:
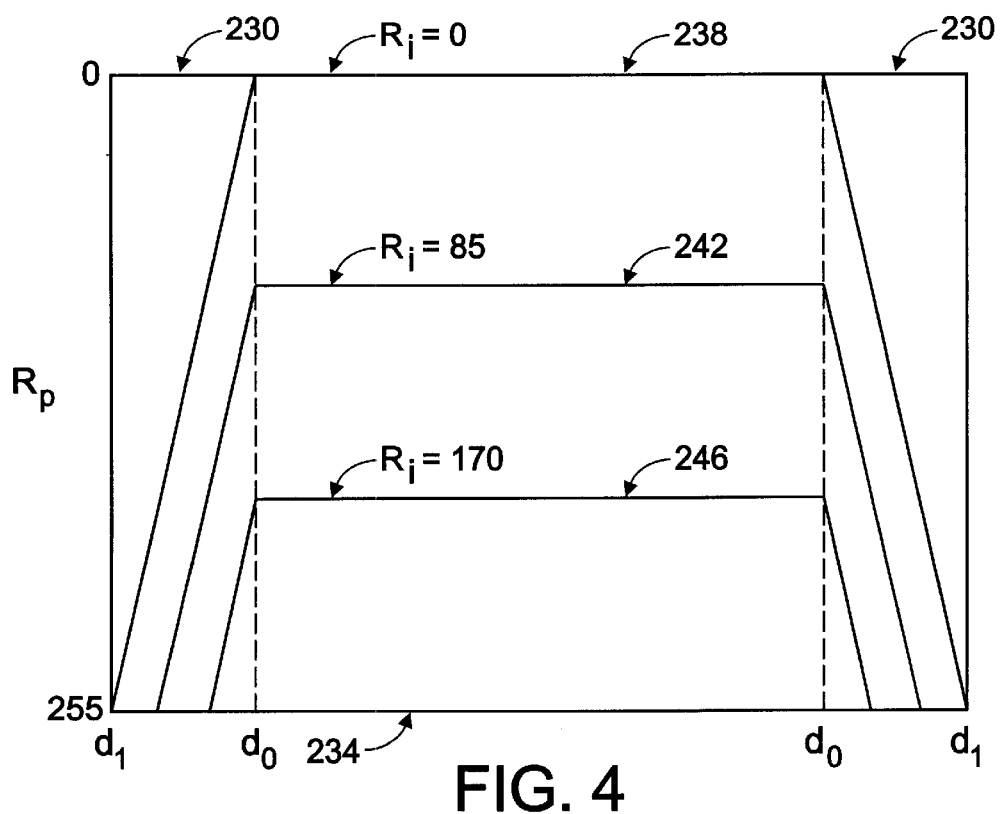
FIG. 4 is a diagram showing the reduction in three different red color intensities according to an alternative reduction scheme as one moves from a beginning to an outer edge of a side edge region of a print sheet; the left axis of the diagram shows the red output grey scale pixel value $R_p$ in reverse fashion, i.e., going from 255 or white at the bottom to 0 or full color at the top, to better allow the visualization of reducing color intensity.

With reference to FIG. 4, using the implementation represented by equations (4), the decrease in the printed red intensity in the side edge regions 230 of a print sheet 234 is shown for three different input pixel values. The input pixel values are:

$R_i$=0, or full red, designated as 238;

$R_i$=85, or dark red, designated as 242; and $R_i$=170, designated as 246.

The reduction in the corresponding output pixel values $R_p$ are shown in the edge regions. The left axis of the diagram shows $R_p$ in reverse fashion, i.e., going from 255 or white at the bottom to 0 or full color at the top, to better allow the visualization of reducing color intensity. It is important to note that the correction or intensity reduction is not a function of the input grey scale pixel value $R_i$. This has the advantage of preserving the relative relationships of the various input pixel values, e.g., $R_i$=85, 238, $R_i$=170, 242, and $R_i$=255, 246, to each other so that the contrast of the image in the edge regions does not change.

Figure 5:
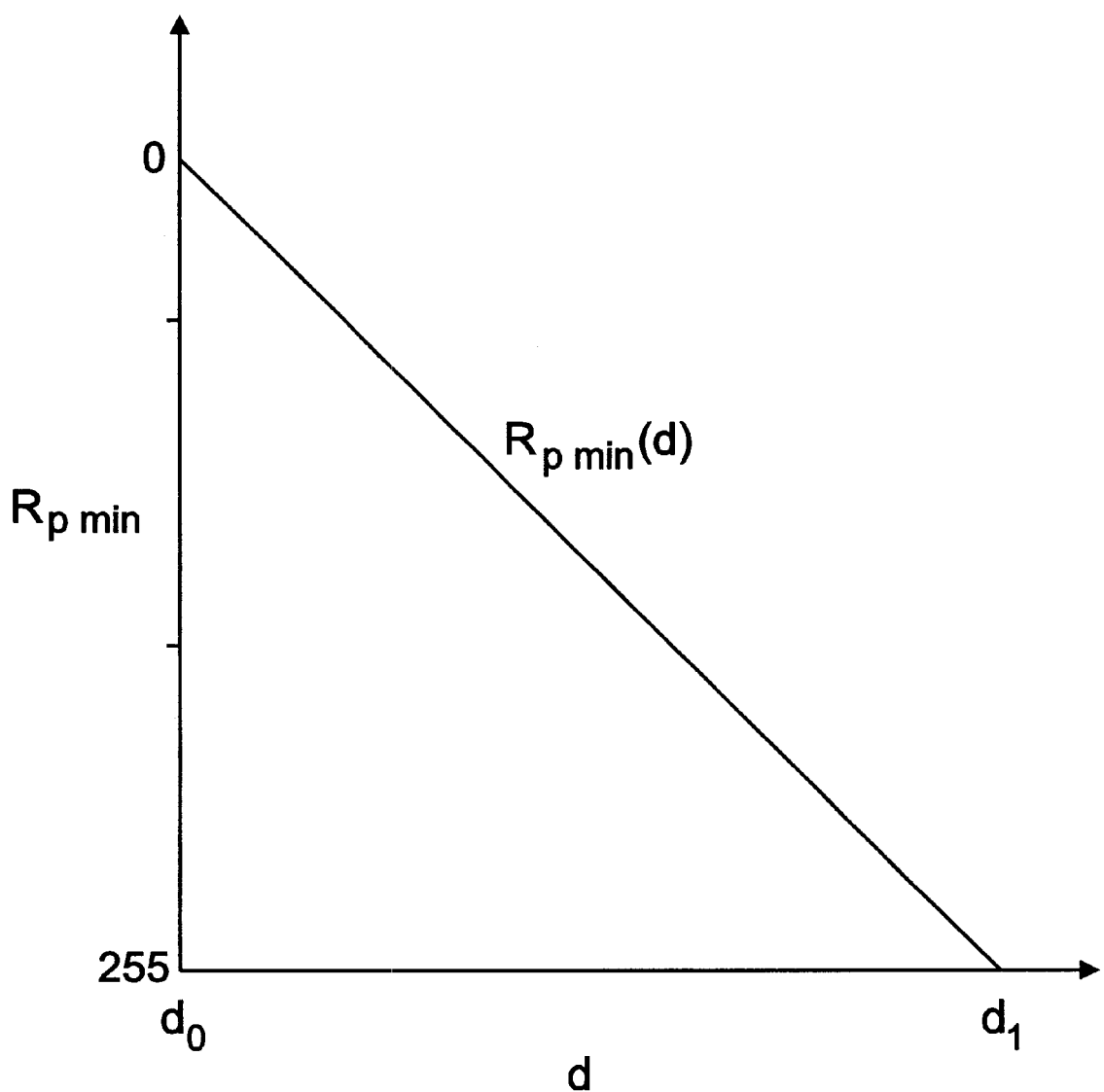
FIG. 5 is a graph of a minimum output grey scale pixel value $R_{pmin}$ versus the location d of an input pixel in an edge region around the perimeter of a printed document in accordance with another embodiment of the invention.

With reference to FIG. 5, in an alternative embodiment, the grey scale pixel value is not increased by a constant or by a factor based on a weighted average of the input pixel value. Rather, a minimum output grey scale pixel value $R_{pmin}$ is defined based on the location of the pixel in the margin or edge region, i.e., between $d_0$ and $d_1$. In other words, an input grey scale pixel value is not adjusted until it is less than the minimum output grey scale pixel value for that location in the margin. If the input grey scale pixel value is less than the minimum, then the output grey scale pixel value is simply set at the minimum for the location of the pixel. For example, a pixel at the location of $d_0$ or 0 mm, or the beginning of the margin, has a minimum output value of 0. If that pixel has a value of 100, it will remain at 100. A pixel at the location of 3 mm has a minimum output value of 128. If that pixel has an input value of 100, it will be set to 128. Of course, in alternative embodiments, the function $R_{pmin}$ (d) may take on other graphical representations (e.g., see generally FIGS. 2A–2D).

All of the above described and other intensity reduction implementations may be generated by the selection or programming of a look-up table in LUT memory. Alternatively, the implementations may be generated by the scaling processor which simply mathematically transforms the input grey scale pixel values to the desired output grey scale pixel values using the above described and other equations. It is further to be appreciated that the implementation of this invention may be carried out in hardware, software or a combination thereof.

Figure 6:
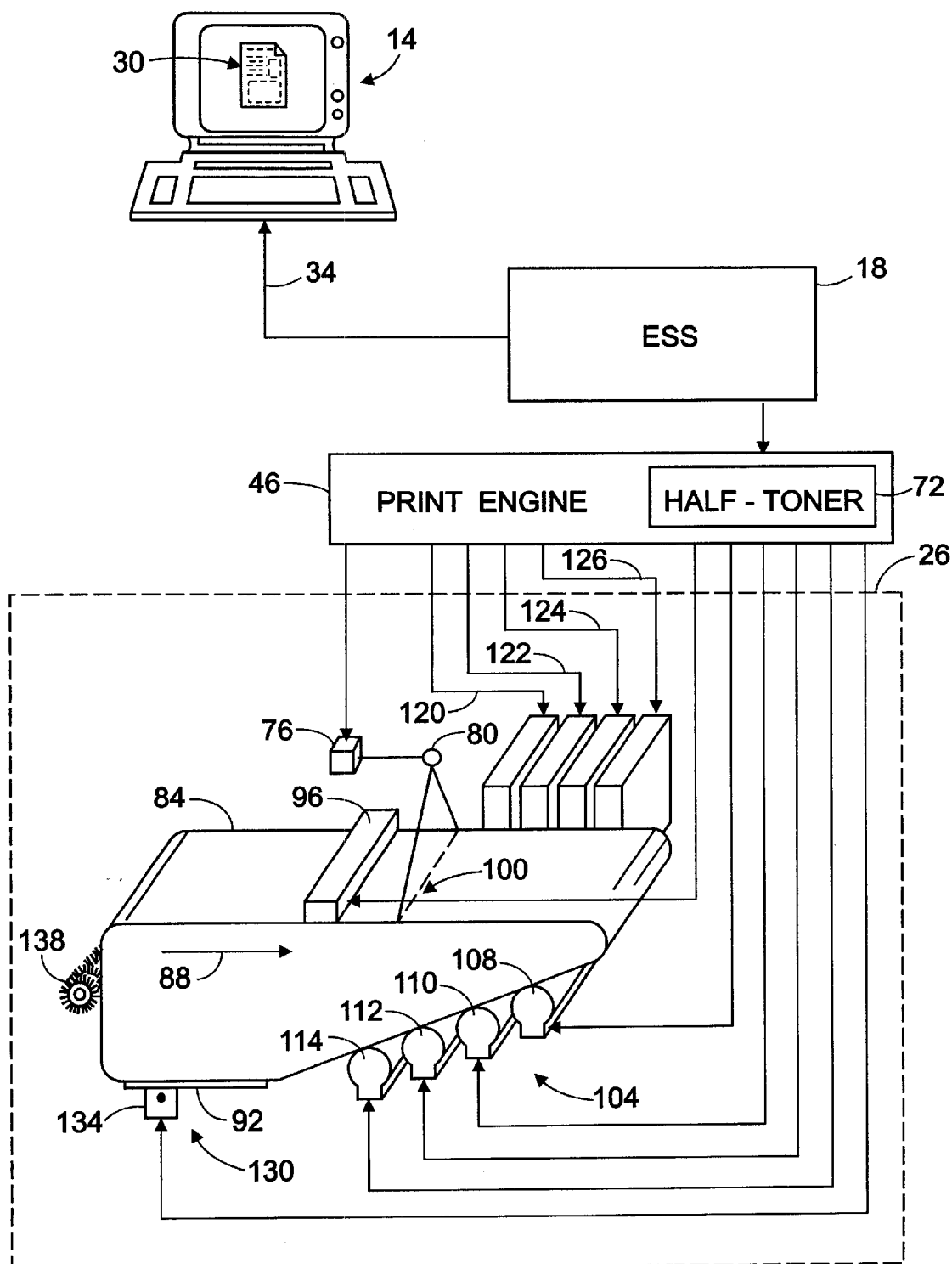
FIG. 6 is a diagram of the digital color image printing system of FIG. 1 including a more detailed elevational view of the printer.

With reference to FIG. 1 and FIG. 6, the print engine 46 includes a half-toner 72 which decomposes the edge-adjusted image data (contone image data) into raster images for printing. Each raster image is a bit map image or series of on and off instructions to tell the printer where to place an ink dot of a particular process color on a sheet of paper. This results in the printed image 32.

With reference to FIG. 4, the printer includes a raster output scanner (ROS) 76 which creates the output print image 32. The ROS preferably includes a laser which may be a solid state device and a rotating polygon mirror 80. The ROS illuminates, via the mirror, the portion of a photoconductive belt 84 at a rate of about 400 pixels per inch to achieve a set of subtractive primary latent images. The photoconductive belt moves in direction 88. The ROS will expose the photoconductive belt to record four latent images which correspond to the signals transmitted from the print engine 26. One latent image is developed with cyan developer material. Another latent image is developed with magenta developer material, a third latent image is developed with yellow developer material, and a fourth latent image is developed a black developer material. These developed images are transferred to a print sheet in superimposed registration with one another to form a multicolored image on the print sheet. This multicolored image is then fused to the print sheet 92 forming the color print 32 (see FIG. 1).

Initially, a portion of photoconductive belt passes by a corona generating device 96 which charges the photoconductive belt to a relatively high, substantially uniform potential. Next, the charged photoconductive surface is rotated to an exposure station, indicated generally by the reference number 100. The exposure station receives a modulated light beam corresponding to information derived by the RIS. The modulated light beam impinges on the surface of photoconductive belt. The beam illuminates the charged portion of the photoconductive belt to form an electrostatic latent image. The photoconductive belt is exposed three or more times to record three or more latent images thereon.

After the electrostatic images have been recorded on the photoconductive belt, the belt advances the latent images to a development station, indicated generally by he reference number 104. The development station includes four individual developer units, 108, 110, 112 and 114. The developer units are of a type generally referred to in the art as "magnetic development subsystems." Typically, a magnetic donor development system employs a magnetizable developer material including magnetic carrier granules having toner particles adhering triboelectrically thereto. The developer material is continually brought through a directional flux field to form a donor of developer material. The developer material is constantly moving so as to continually provide the donor with fresh developer material. Development is achieved by bringing the donor of developer material in sufficiently close vicinity of the photoconductive surface. The developer units 108, 110, and 112 apply toner particles of a specific color which corresponds to the complement of the specific color separated electrostatic latent image recorded on the photoconductive surface. The developer units are controlled by toner dispenser motor controls 120, 122, 124, and 126.

The color of each of the toner particles is adapted to absorb light within a preselected spectral region of the electromagnetic wave spectrum. For example, an electrostatic latent image formed by discharging the portions of charge on the photoconductive belt corresponding to the green regions of the document will record the red and blue portions as areas of relatively high charge density on photoconductive belt, while the green areas will be reduced to a voltage level ineffective for development. The charged areas are then made visible by having developer unit 108 apply green absorbing (magenta) toner particles onto the electrostatic latent image recorded on photoconductive belt. Similarly, a blue separation is developed by the developer unit 110 with blue absorbing (yellow) toner particles, while the red separation is developed by the developer unit 112 with red absorbing (cyan) toner particles. The developer unit 114 contains black toner particles and may be used to develop the electrostatic latent image formed from a black and white document or to provide undercolor removal. Each of the developer units is moved into and out of an operative position. In the operative position, the magnetic donor is substantially adjacent the photoconductive belt, while in the nonoperative position, the magnetic donor is spaced therefrom. During development of each electrostatic latent image, only one developer unit is in the operative position, the remaining developer units are in the nonoperative position.

After development, the toner image is moved to a transfer station (not shown) in transfer region 130. In the transfer region, the toner image is transferred to a print sheet of support material, such as plain paper. A corona generating device 134 sprays ions onto the backside of sheet 92 so as to charge the sheet to the proper magnitude and polarity for attracting the toner image from the photoconductive belt. In the transfer region, the sheet is moved into contact with the photoconductive belt. The sheet moves in a recirculating path for three or four cycles. In this way, three or four different color toner images are transferred to the sheet in superimposed registration with one another. After the last transfer operation, the sheet is transported to a fusing station (not shown) where the transferred toner image is permanently fused to the sheet. A cleaning device 138, such as a fibrous brush, cleans excess toner from the photoconductive belt.

Rather than printing, the adjusted contone image may be stored on the hard disk drive 44 (FIG. 1) a floppy disk, or transferred over a network for later or remote printing. It is to be appreciated by those skilled in the art that additional processors or processing steps may be added to give the options of storing or transferring the image data either subsampled or non-subsampled in either a compressed or uncompressed format. Further, the invention may be practiced in other color spaces such as CIE L*a*b*, Luv or monochrome.

As stated above, the ESS controls all image processing, machine steps and functions described herein, and others, including the operation of the printer. However, it is to be appreciated that in other embodiments, the ESS does not perform all image processing or control the printer. This is particularly the case where the edge-adjusted contone file is brought to another printer for printing. Further, it is to be appreciated that the printer and the steps of printing includes all types and methods of placement of ink or toner onto print sheets such as paper.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. A digital image processing apparatus for adjusting input pixel intensity values in an edge region of input image data to form corresponding output pixel intensity values that are printed on an edge region of a print sheet, the apparatus comprising:

an edge processor for adjusting the input pixel intensity values of the edge region of the input image based at least partially upon a location of the corresponding output pixel intensity values in the edge region of the print sheet to form output intensity pixel values in said edge region of said print sheet that fade toward a background intensity value moving from an inner portion to an outer portion of said print sheet edge region, wherein the edge processor adjusts only input intensity pixel values in the edge region that do not already meet a predetermined intensity level pixel value; and, a printer for printing the output intensity pixel values on an edge region of a print sheet, said edge region of said print sheet located at a periphery of said print sheet.

2. The apparatus as set forth in claim 1 further including:

a look-up table memory including look-up tables for mapping the input intensity pixel values at the edge region of the input image to the output intensity pixel values, wherein the edge processor accesses the look-up table memory.

3. The apparatus as set forth in claim 1 wherein the edge processor includes a scaling processor for adjusting the input intensity pixel values at the edge region of the input image to form the output intensity pixel values.

4. The apparatus as set forth in claim 1 wherein the edge processor adjusts an input intensity pixel value by factor that is dependent on the location of the pixel value between the inner portion and outer portion of the edge region of the printed sheet.

5. The apparatus as set forth in claim 4 wherein the factor increases from the inner portion to the outer portion of the edge region of the printed sheet.

6. The apparatus as set forth in claim 1 wherein the predetermined intensity pixel value changes depending upon the location of the input intensity pixel value in the edge region between an inner edge region and an outer edge region.

7. The apparatus as set forth in claim 1 wherein the edge region of the print sheet corresponding to the edge region of the input image data is less than 15 mm in width.

8. The apparatus as set forth in claim 4 wherein the print sheet is generally of size A4 and the edge region of the print sheet is approximately 6 mm in width.

9. A method of digital image processing to adjust input pixel intensity values in an edge region of input image data to form output pixel intensity values that are printed on a peripheral edge region of a print sheet, the method comprising:

adjusting the input pixel intensity values for the edge region of the input image depending at least partially upon a location of each of said input pixel intensity values in the edge region to form output intensity pixel values, said step of adjusting including adjusting input intensity pixel values in the edge region that satisfy a predetermined intensity level pixel value threshold; and, printing the output intensity pixel values on a peripheral edge region of a print sheet.

10. The method as set forth in claim 9 wherein the step of adjusting includes:

accessing a look-up table; and mapping the input intensity pixel values to the output intensity pixel values according to the look-up table.

11. The method as set forth in claim 9 wherein the step of adjusting includes:

applying a mathematical equation to the input intensity pixel values to form the output grey scale pixel values.

12. The method as set forth in claim 9 wherein the step of adjusting includes:

adjusting an input intensity pixel value by a factor that is dependent on the location of the corresponding output intensity pixel value between an inner edge and an outer edge of the edge region of the printed sheet.

13. The method as set forth in claim 12 wherein the factor increases from the inner edge to outer edge of the edge region of the printed sheet.

14. The method as set forth in claim 9 wherein the predetermined intensity pixel value threshold changes moving from an inner edge to an outer edge of the edge region of the printed sheet.

15. The method as set forth in claim 9 wherein the step of printing includes:

printing on a print sheet, wherein the edge region of the print sheet that corresponds to the edge region of the input image data is less than 15 mm in width.

16. The method as set forth in claim 15 wherein the print sheet is generally of size A4 and the edge region of the print sheet is approximately 6 mm in width.

* * * * *